Jan. 2, 1934.  J. H. VIELE ET AL  1,942,313
PRESSURE RELIEVING CHECK VALVE FOR FLOW LINES
Filed Sept. 2, 1931
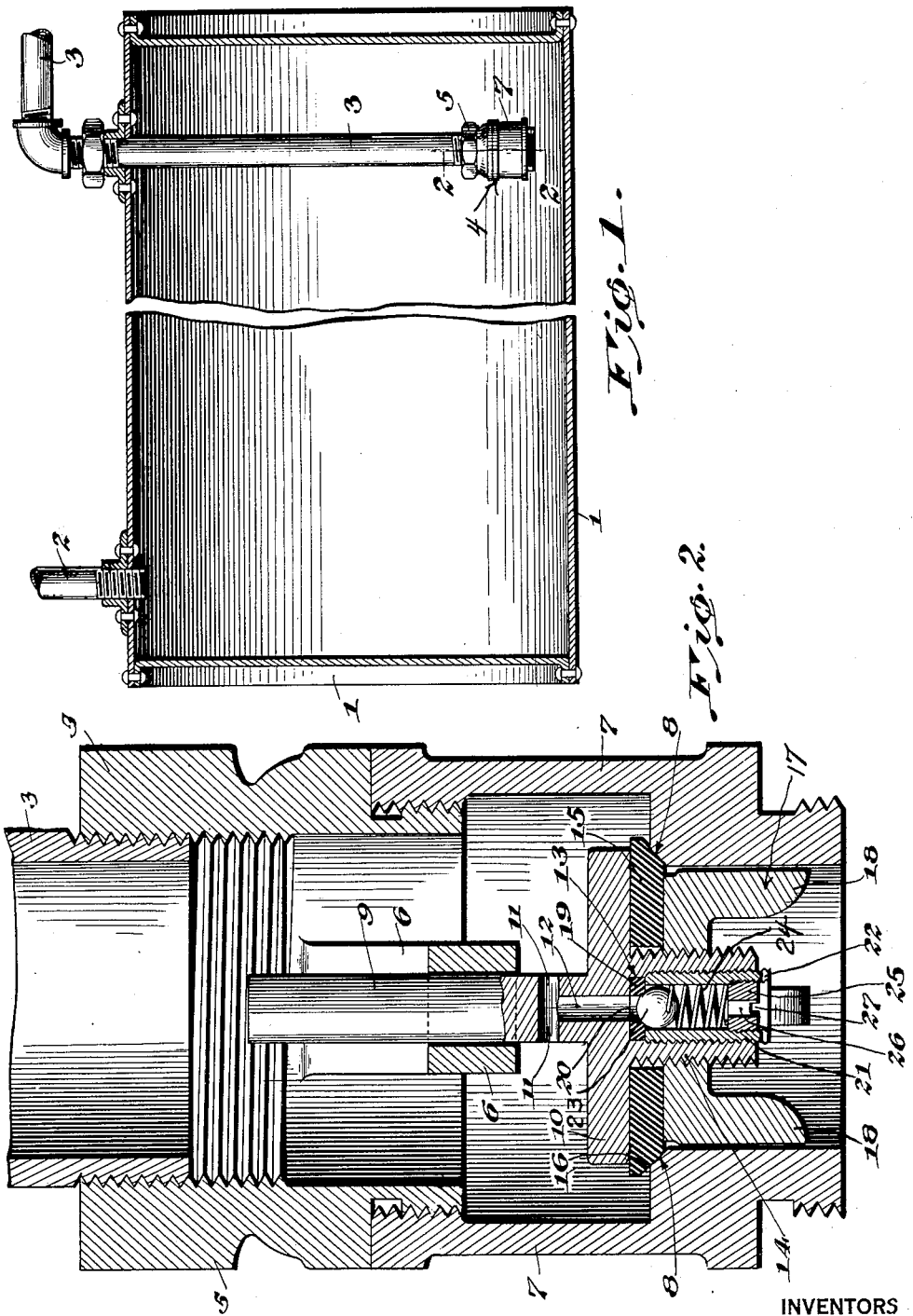
INVENTORS
J. H. Viele
C. W. Swift.
BY
ATTORNEY
WITNESSES Patented Jan. 2, 1934

1,942,313

UNITED STATES PATENT OFFICE 1,942,313

PRESSURE RELIEVING CHECK VALVE FOR FLOW LINES

John Hyde Viele and Charles W. Swift, Elmira, N. Y.

Application September 2, 1931. Serial No. 560,848

1 Claim. (Cl. 277—45)

Our invention relates to check valves or the like such as are customarily incorporated in fluid flow lines in which the fluid is drawn by suction or otherwise from a storage area either in flow line or container, at one side of the check valve to the opposite side of the check valve, and is more particularly concerned with the incorporation in the check valve of means for relieving abnormal pressures in the flow line at said opposite side of the check valve.

The well known gasoline storage tank and its connected dispensing flow line constitute a well known and illustrative structure to which the present invention is applicable, although its application is by no means limited to this specific instance. The check valve incorporated in the storage tank end of the flow line serves to retain in the flow line the gasoline drawn to the upper side of the check valve by the dispensing pump, for example. Gasoline, as is well known, expands tremendously under the influence of heat, such as is caused by the exposure of the flow line to the heat of sun or outdoor temperatures, causing high back pressure against the check valve and heavy abnormal pressure against the pump gaskets, joints and flow line. The gasoline under this pressure will leak at the weakest point in the line, such for example, as at pump gaskets, valves, and dispensing hose, frequently being ignited and causing serious damage. Any outside venting of the gasoline under these conditions is not only wasteful of the gasoline or other fluid, but, in the case of inflammable fluids, such as gasoline and oils, increases the fire hazard, and will not meet with the approval of the Fire Underwriters.

Our invention surmounts these difficulties and provides a simple and efficient back pressure relief valve incorporated in the check valve itself and serving automatically to vent back into the storage area, gasoline or other flow line fluid at the opposite side of the check valve whose pressure against the check valve has been unduly increased as by heat. As a further feature of the invention, means are provided for varying the venting pressure, thereby adapting the pressure relief valve to fluids having varying co-efficients of expansion under heat.

These and other features including structural details and combinations of parts will be more clearly apparent from the following detailed specification which is to be read in conjunction with the accompanying drawing forming part thereof and in which:

Fig. 1 is a view in longitudinal vertical section of an illustrative gasoline storage tank and its dispensing flow line, incorporating at its lower intake end, a check valve constructed in accordance with the present invention, Fig. 2 is a vertical sectional view on an enlarged scale through the check valve, taken on line 2—2 of Fig. 1.

Referring to the drawing: In Fig. 1 is shown an illustrative flow line layout comprising the usual gasoline storage tank 1, with its fill pipe 2, and dispensing flow line 3 leading to the usual dispensing pump and hose (not shown). The intake end of the flow line 3 terminates at a point adjacent the bottom of the tank 1 where it is normally equipped with a check valve, generically designated at 4, which may advantageously be constructed in accordance with the present invention.

In Fig. 2 is shown an enlarged sectional view of a check valve 4 constructed in accordance with the present invention. Referring specifically to Fig. 2, it will be seen that upon the lower end of the intake flow line 3, is threaded the upper section 5 of a check valve casing having the usual centered valve stem guiding spider 6 therewithin. The usual lower section 7 of the valve casing threads at its upper end on to the threaded lower end of the upper section 5 and is formed internally with the usual tapered valve seat 8 edging the intake at the lower end of section 7. This construction of casing is standard and its specific structure forms no part of the present invention.

In accordance with our invention we have incorporated in a check valve a valved back pressure relieving vent. One form which such valve may take is illustrated in Fig. 2. The valve body comprises a centered solid cylindrical stem 9 upstanding from a flat upper seating portion 10. Adjacent the base of the stem 9, a lateral traversing back pressure intake bore 11 communicates centrally of the stem with a vertically bored vent 12 which passes through the seating portion 10 and merges at the lower side thereof into a concentric passage 13 of substantially greater diameter enclosed by a tubular boss 14 preferably formed integrally with the upper valve seating portion 10 and externally and internally threaded.

The underside of the seating portion 10 is faced with an annular gasket 15 of compressible material having a bevelled outer edge 16 corresponding with and engaging the tapered valve seat 8. This gasket is held tightly against the underface of the upper valve seating portion 10 by the annular lower valve portion 17 threaded externally over the boss 14 to engage the gasket 15 with its upper face. The lower valve portion 17 may be and preferably is provided with the usual guide lugs 18.

At the upper end of the passage 13 a valve control for the relief vent 12 is provided. To this end, a gasket 19 of compressible material is tightly fitted to the upper end of passage and provided with a central opening 20 alined with the lower end of vent 12. The gasket 19 is firmly held in place by the upper end of an externally threaded sleeve 21, threading on the interior of boss 14 and engaging the gasket 19 with its upper edge. The lower edge of the sleeve may be conveniently slotted, as at 22, to facilitate its assembly by a screw driver.

The lower end of the vent opening 20 in gasket 19 is normally closed by a ball valve 23, preferably of Monel metal, of a diameter for insertion within sleeve 21 to seat in and close the lower end of gasket vent 20. The ball valve is normally held to its seat by the upper end of a coiled spring 24 of determinate strength, housed within sleeve 21 and seated at its lower end upon a spring pressure varying plug 25 threading into the lower end of sleeve 21 which is internally threaded to receive it. This plug is provided with a central vent bore or fluid discharge 26, and at its lower end with a cross slot 27 to facilitate spring pressure adjustment by screw driver.

The yield point of the ball valve to back pressure against the opposite upper face of the check valve transmitted through the relief vent may be definitely prefigured through spring pressure adjustment of the plug and the same valve may therefore be adapted to use with fluids of varying coefficients of expansion. Furthermore, with a fluid such as gasoline, capable of such rapid and high expansion through heat, the yield point may be set at a relatively low point of abnormal back pressure so that the fluid will be vented back to the storage area before dangerously high pressures are attained, the fluid under these conditions of expansion venting back as a drip, without loss of fluid or of priming volume, and without creation of any fire hazard by external leakage through dangerously high abnormal pressures.

While we have described the application of our check valve to a gasoline flow line as best exemplifying its correction of a dangerous situation of wide occurrence, we do not intend that the invention be construed as so limited in its application, but that its field of application be coextensive with the spirit of the invention and the scope of the appended claim.

What we claim, therefore, and desire to secure by Letters Patent is:

A check valve mechanism for fluid flow lines, comprising a casing and a valve seat, a centrally disposed guide stem located in said casing and movable with respect thereto, an upper valve member secured to said stem and having a reduced threaded portion, annular gaskets of compressible material surrounding said reduced portion and arranged to bear on said seat, a lower valve member provided with a threaded opening arranged to receive the threaded reduced portion and to clamp said gasket against the lower face of said upper valve member, said reduced portion having a centrally disposed threaded bore and said upper valve portion having a reduced passage communicating with said bore, a gasket in said bore having an opening forming a continuation of the passage, a threaded sleeve in said bore for holding said last named gasket in position, and a spring pressed closure within the sleeve for normally closing the passage.

JOHN HYDE VIELE.
CHARLES W. SWIFT.